United States Patent [19]

Yamada et al.

[11] 4,029,945
[45] June 14, 1977

[54] CARD AND CARD READER APPARATUS THEREFOR

[75] Inventors: Siyouhachi Yamada, Machida; Reigi Nakatsubo, Tokyo, both of Japan

[73] Assignee: Stanley Electric Co., Ltd., Tokyo, Japan

[22] Filed: Aug. 27, 1975

[21] Appl. No.: 608,269

[52] U.S. Cl. ............... 235/61.12 N; 235/61.11 H; 235/61.11 D; 235/61.7 B; 340/149 A
[51] Int. Cl.² ................. G06K 7/08; G06K 19/06
[58] Field of Search ............ 235/61.11 R, 61.11 D, 235/61.11 H, 61.12 R, 61.12 N, 61.12 C, 61.7 B; 340/149 A, 173; 307/113; 346/74 S

[56] References Cited

UNITED STATES PATENTS

| | | | |
|---|---|---|---|
| 2,774,060 | 12/1956 | Thompson | 235/61.12 C |
| 3,245,054 | 4/1966 | Bryon | 235/61.12 R |
| 3,378,920 | 4/1968 | Cone | 235/61.12 C |
| 3,387,265 | 6/1968 | Smeiman | 340/149 A |
| 3,564,214 | 2/1971 | Cooper | 235/61.11 H |
| 3,719,804 | 3/1973 | Illing | 235/61.12 N |
| 3,728,523 | 4/1973 | Torok | 235/61.11 H |
| 3,793,600 | 2/1974 | Grosbard | 235/61.12 N |
| 3,906,201 | 9/1975 | Housman | 235/61.7 B |

*Primary Examiner*—Robert M. Kilgore
*Attorney, Agent, or Firm*—Flynn & Frishauf

[57] ABSTRACT

A card comprises a plurality of code storing mediums arranged between two opaque, non-magnetic sheets and each having a constricting portion. The code storing mediums are looped and open-loop metallic pieces of conductive material. Such a card is inserted into a card reader apparatus which is permitted to read the stored information by detecting a presence of oscillation involved with a change of coupling degree of coils in a detecting body generated according to a difference between shapes of the code storing mediums.

13 Claims, 8 Drawing Figures

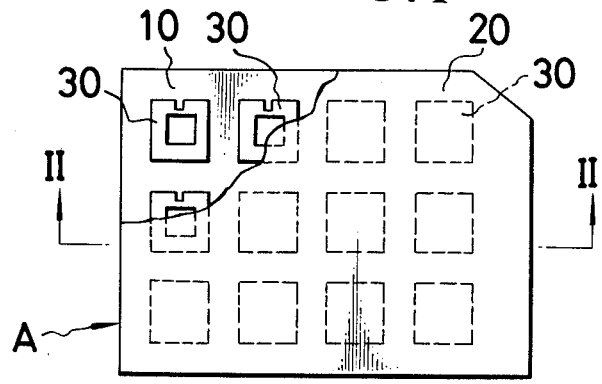
FIG.1
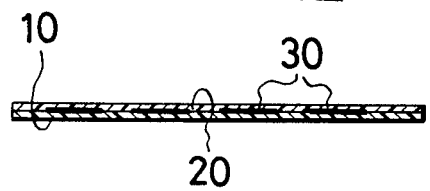
FIG.2
FIG.3  FIG.4
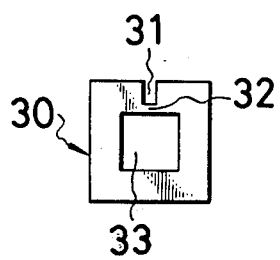 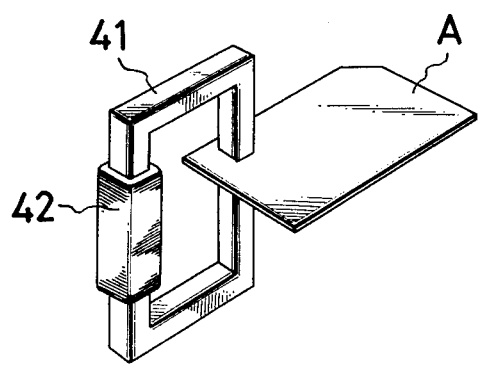
FIG.5
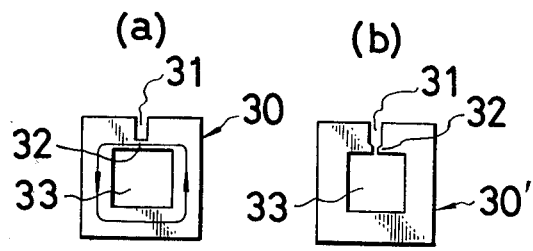

CARD AND CARD READER APPARATUS THEREFOR

BRIEF SUMMARY OF THE INVENTION

The present invention relates to a card and an apparatus for storing encoded information stored in the card.

In the prior art, there are two typical cards for storing encoded information, one of which is a magnetic card, and the other of which is a punched card. In the magnetic card, a recording medium consisting of a magnetic tape or paper is applied on a plastic sheet and encoded information is stored in the recording medium by means of a magnetic head. In such a magnetic card, the reading of the stored information is effected by displacing the card or the magnetic head, by detecting magnetic changes of the card and by converting them into electric signals. In the puched card, storage of encoded information is effected by forming holes on an opaque paper or on a plastic sheet having a fixed form. In such a puched card, the reading of the stored information is effected by detecting a presense of holes with illumination light and converting it an electric signal.

However, there are the following defects in both cards as mentioned above. That is, since the magnetic card can not read unless the card or the magnetic head is relative to the other displaced, input and output mechanisms for information become complicated and the life time of the card becomes short since the card wears down because of a sliding contact of the magnetic head on the card surface. It is further feared that stored informations may disappear from the card being exposed to magnetism. On the other hand, since the puched card is provided with holes thereon to store information, it is not only esthetically but undesirable, it can be easily reproduced. Therefore, the card is not suitable for articles which require secrecy, such as credit cards, identification cards, keys of electric locks or the like. It is also difficult to print on a surface of the card because of having holes.

To solve defects in the prior art mentioned above, one object of the present invention is to provide a card and its associated techniques wherein storage contents are exactly storable over a long time and can be kept a secret.

Another object of the present invention is to provide a method for producing a card which can not distinguish information storing mediums and which can not discriminate storage contents on the basis of its external appearance even if it is disassembled.

A further object of the present invention is to provide a card reader apparatus for reading encoded information stored in a new card of the present invention.

A still further object of the present invention is to provide a card reader apparatus which can read stably and correctly information stored in the card without contacting the card.

SUMMARY OF THE INVENTION

According to one aspect of the present invention, a card comprises a card body comprising a plurality of looped code storing mediums of conductive material each having a constricting portion. The staring mediums are disposed on a desired position of a first opaque, non-magnetic sheet having a fixed form and further are covered by a second opaque, non-magnetic sheet adhered to the first sheet. Encoded information is stored in the storing mediums of the card by allowing electric current to flow in the desired storing medium with the action of electromagnetic induction and by cutting by melting the constricting portion of the storing medium with the aid of Joule heat caused by the electric current.

According to another aspect of the present invention, a card is produced by adhering a half surface thereof which is divided by the constricting portion which acts as a border on a desired position of a first opaque, non-magnetic sheet having a fixed form and by adhering an opposite surface of the other half surface of the looped code storing medium on a second opaque, non-megnatic sheet adapted to cover the code storing medium. The first and second sheets are adhered to each other.

According to a further aspect of the present invention, a card reader apparatus comprises a detecting body on which a pair of coils are disposed on a common axis to have a clearance for therebetween for inserting a card, an oscillator circuit coupled to said coils and constructed to satisfy or not satisfy an oscillating requirement according to a change of degree of coupling of an electromagnetic induction of both the coils in the detecting body, and a circuit for discriminating an operative condition of the oscillator circuit, whereby when a card having closed-loops and open-loop code storing mediums of conductive material is inserted into the clearance of the detecting body, the reading of the information stored in the card is effected by detecting a presence of oscillation involved with the change of degree of coupling of both the coils in the detecting body caused by a difference of shapes of code storing mediums.

BRIEF DESCRIPTION OF THE DRAWING

These and other objects, advantages and features of the present invention will become more apparent as the description proceeds, when considered with accompanying drawing in which:

FIG. 1 is a plan view partially cut showing a card according to the present invention;

FIG. 2 is a cross-sectional view taken along the line II—II of FIG. 1;

FIG. 3 is a plan view showing a metallic piece;

FIG. 4 is an schematic perspective view showing a information storing mechanism;

FIG. 5a and 5a are plan views of metallic pieces shown to explain an information storing operation;

DETAILED DESCRIPTION

Figure 6:
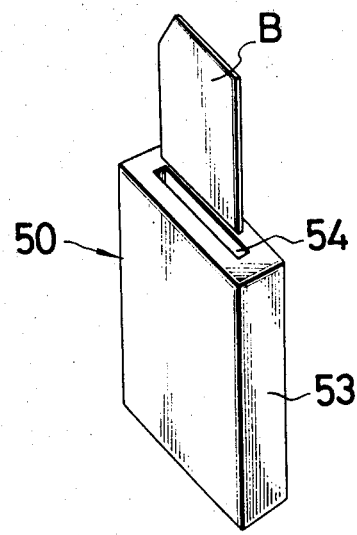
FIG. 6 is a perspective view showing an external appearance of a card reader apparatus according to the present invention.

Referring to FIG. 1 to 3, a card body A includes opaque, non-magnetic sheets 10 and 20 of plastic material or the like having a fixed form, for example, a shape cut at one corner of a size of a business card. Between sheets 10 and 20 are interposed a plurality of metallic pieces 30, 30. The sheets 10 and 20 are are adhered to each other to constitute the card body A. The metallic piece 30 is formed by an aluminum foil in the form of rectangular ring, for example, as shown in detail in FIG. 3 and is provided with a deep notch 31 cut from the outer end surface at one side. That is, the metallic piece 30 is formed in a looped shape which has a constricting portion 32 at one portion thereof. A plurality of metallic pieces 30 so formed are adhered on the sheet 10 having a size of a business card in a given relationship and are covered over by the sheet 20, whereby the sheet 10 and 20 are entirely formed by adhering on to the other. The a number and particular arrangement of the metallic pieces 30, 30 . . . are determined according to the quantity of information to be stored in the card.

In the embodiment shown in FIG. 3, though the metallic piece 30 is illustrated as an information storing medium in the form of a rectangular ring, it may also be a circular ring having a constricting portion at one portion thereof. Also, the material may be optionally selected from any type of conductive material without being limited only to metal. To form the metallic piece, there can utilize various methods, such as adhering, vaporizing, printing or the like.

To store the desired encoded information desired in the above mentioned card body, as shown in FIG. 4, a device is used having a coil 42 wound around an iron core 41 having a gap, the coil being connected to an alternating current source. When the card body A is inserted into the gap (as shown in FIG. 4) in a manner that magnetic flux passes through a hollow portion 33 of the metallic piece 30, electric current (arrow FIG. 5a) flows according to a voltage induced in the metallic piece 30 under the action of electromagnetic induction. Since the metallic piece 30 is a looped shape having a constricting portion 32 at one portion thereof, a cross-sectional area of the constricting portion 32 is very small and therefore its electric resistance becomes high. For this reason, when the current flows, a high Joule heat occurs in the constricting portion 32 whereby the latter is melted and the loop becomes in a cut or open condition (open-loop), as shown in FIG. 5b. Thus, a particular card is made by changing a selected metallic piece 30 into an open-looped metallic piece 30' and by storing a desired encoded information. The storage content so stored is impossible to discriminate from its external appearance. Only the basic principle of the storing operation is shown in FIG. 4 and for practical purposes the storing device has an inserting port for inserting a card body having a fixed form in a certain direction and is provided with a flux generating portion internally disposed according to an arrangement of metallic pieces of the card body. By using such a device, the metallic piece is cut by melting at the constricting portion of a selected metallic piece.

Upon making the card body A as shown in FIG. 1 and 2, the metallic piece 30 is caused to adhere over half the surface thereof which is divided at the constricting portion 31, on a desired position of the opaque, non-magnetic sheet 10 having a fixed form. an opposite surface of the other half surface thereof which is divided at the constricting portion is adhered on the opaque, non-magnetic opposing sheet 20 to cover the metallic piece 30. Accordingly, even if both the sheets 10 and 20 are peeled off from each other, simultaneously with the peeling off operation, the metallic piece is broken in two at the constricting portion. Thus, forgery is very difficult since a distinction between the closed-loop metallic piece 30 and the melted, open-loop metallic piece 31'(FIG. 5b) is impossible. Therefore, the card is suitable for an article which requires secrecy for example, a credit card, the key of an electric lock or the like, in addition to an article not requiring secrecy, for example, card for inventory control, a storage cell in an information machine or the like. In accordance with this card, the information storing medium is a normally looped body of conductive material, such as a metallic piece or the like and is provided with a constricting portion at one portion of the body. Since the metallic piece is distinguished by "cutting" and "continuing" of the constricting portions, the card is not effected and the stored information cannot disappear by exposure magnetism as in the known magnetic card. Further, the card of the present invention has advantages in that it is easy to maintain, to keep and to handle, and that since the cards storing and not storing information are generally the same shape and have the same external appearance, distinction therebetween is not easy.

As mentioned above, a desired number of the metallic pieces 30 are disposed between the sheets 10 and 20 at a desried position and desired melted pieces 31' are formed by the principle as shown in FIG. 4 after sticking both the sheets each other. Accordingly, the productivity of the card improves and arbitrary information can be stored by the user without making a particular card in the card maker, whereby it is advantageous since the user may keep the contents of the card.

The reading of the card so produced requires only inserting it into a card inserting port of a card reader apparatus hereinafter described. Since the card surface need not slidingly contact with a detecting body, its expected life is semipermanent without wearing of the card.

Figure 7:
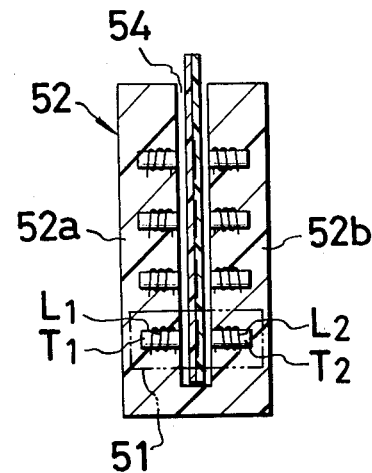
FIG. 7 is a schematic sectional view showing a detecting mechanism of the apparatus of FIG. 6.
Figure 8:
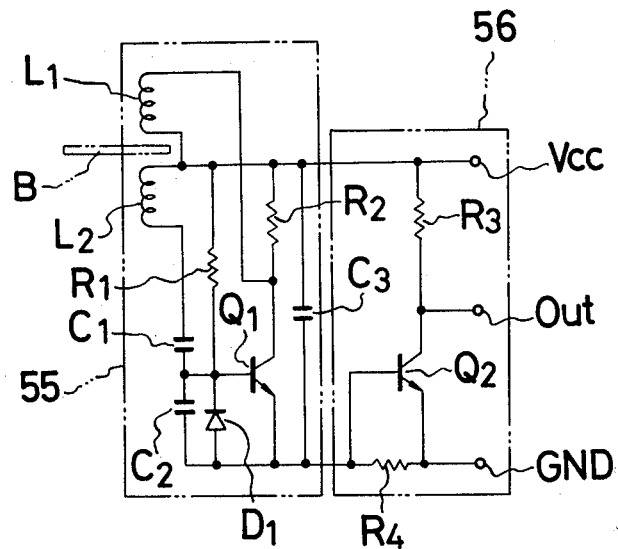
FIG. 8 is a diagram showing an essential circuit of the card reader apparatus.

A card reader apparatus for reading the stored information from the card and storing information as mentioned above. Referring to FIG. 6 and 7, reference numerals 53, 52 and 51 indicate a casing, a supporting portion for at least one detecting body, and a detecting body, respectively. The casing 53 has a card inserting portion 54 on an upper surface thereof. The supporting portion 52 is formed by an isolating material to be in the form of a U-shape in section. A gap between sides 52a and 52b is for insertion and withdrawal of a card B. The detecting body 51 is formed by supporting on the inner surface side of the sides 52a and 52b bar iron cores $T_1$ and $T_2$ around which coils $l_1$ and $L_2$ are wound. The coils oppose to each other at the end surfaces of the cores. The pair of coils $L_1$ and $L_2$ are incorporated in an oscillator circuit 55 as shown in FIG. 8 and detect a difference of shapes of the metallic pieces 30 and 30' by controlling the oscillation according to density of the degree of coupling. The detecting bodies 51 are provided in number and arrangement corresponding to the number and the arrangement of the code storing mediums of the card B. Further, provided in an inner space of the supporting portion 52 is a guide for limiting a position of the card B(not shown).

FIG. 8 is a circuit diagram showing an oscillator circuit 55 having coils $L_1$ and $L_2$ of the detecting body 51 as part of the circuit, and a discriminator circuit 56 for discriminating an operative condition of the oscillator circuit 55. The oscillator circuit 55 is constructed to satisfy or not satisfy the oscillation requirement (that is, to oscillate or not oscillate) according to the degree of coupling in electromagnetic induction of both the coils $L_1$ and $L_2$.

The oscillator circuit 55 is constituted by connecting a base and a collector of a NPN type transistor $Q_1$ to an electric power terminal Vcc through the intermediary of resistors $R_1$ and $R_2$, by connecting in series coils $L_1$ and $L_2$ of the detecting body 51 and a capacitor $C_1$ between the collector and the base, by connecting to the power terminal Vcc the connecting point of the coils $L_1$ and $L_2$, by connecting a parallel circuit of a capacitor $C_2$ and a diode $D_1$ between the base and the emitter of the transistor $Q_1$ and by further connecting between the collector and emitter a capacitor $C_3$.

The discriminating circuit 56 is constituted by connecting a collector of a NPN type transistor $Q_2$ to the power terminal Vcc through a resistor $R_3$, by connecting an emitter of the transistor $Q_2$ to a ground terminal GND, and by connecting a resistor $R_4$ between the emitter and the base which is connected to the emitter of the transistor $Q_1$. A voltage drop occurs in the resistor $R_4$ according to an oscillation current generating during the oscillation of the oscillator circuit 55. The transistor $Q_2$ is on with the dropped voltage and it is discriminated as "oscillation" when the collector voltage, that is, the voltage of output terminal Out is approximately ground potential.

However, the oscillation of the oscillator 55 is determined by the degree of coupling between the coils $L_1$ and $L_2$ in the detecting body 51 corresponding to the shape of the code storing medium in the card B which is inserted into the clearance of the detecting body 51. For example, in the illustrated embodiment both coils $L_1$ and $L_2$ are wound in a relationship that the coupling is close at a condition inserting the card or upon a presence of an open-loop code storing medium and that in this case the oscillation stops.

The oscillator circuit 55 may be fully satisfied by effecting the control of oscillation according to density of coupling of the electromagnetic induction between the coils $L_1$ and $L_2$, without limiting to the illustrated embodiment. The discriminator circuit 56, also, may be replaced by other suitable discriminating means.

The operation of the card reader apparatus will now be explained. The coupling of the electromagnetic induction of the coils $L_1$ and $L_2$ in the detecting body 51 is close at a condition at which the card B is not inserted into the card inserting port 54 of the casing 53 and therefore the oscillator circuit 55 is in a an oscillation condition. In this condition, whent the card B is inserted into the card inserting port 54, both the coils $L_1$ and $L_2$ of the detecting body 51 on which the looped metallic piece 30 of the card B exists reduce the degree of coupling under the action of so called one wound coil. For this reason, the oscillation requirement of the oscillator circuit 55 is satisfied to allow its oscillation to begin and the oscillation current flows in the resistor $R_4$. A part of the voltage drop generated in the resistor $R_4$ applies between the base and emitter of the transistor $Q_2$ and the latter becomes on whereby the collector voltage, that is, the voltage of the output terminal Out falls to ground potential.

On the one hand, the coils $L_1$ and $L_2$ in the detecting body 51 opposite which the open-loop metallic piece 30' exists do not change substantially the degree of coupling from the insertion of the card end because the metallic pieces 30' have not the action of one wound coil since the piece is the open-loop shape. Therefore the oscillator circuit 55 is in a condition non-oscillation. For this reason, the transistor $Q_2$ is in the $OF_f$ condition and the voltage of the output terminal Out is generally at the same high level as the voltage of the power terminal Vcc.

The voltage level of the output terminal Out becomes the low or high level according to the shape of the metallic piece in the card B, that is, a looped metallic piece 30 or an open-loop metallic piece 30'. Consequently, the contents stored in the card B can read by reading the voltage level of the output terminal Out. During the reading operation, since the apparatus is not necessary to slidingly contact the detecting body 51 with the card surface B and some gap may exist, the card B does not wear and the life time becomes semipermanent. Also, since the detection is effected by the change of the degree of coupling between the coils $L_1$ and $L_2$, the operation is very stable and is capable of exact reading. Further, the present invention results in apparatus which is simple in structure and which is cheap is cost.

It should be understood that the form of the invention herein shown and described is to be taken as a preferred embodiment of the same and that various changes in the shape, size and arrangement of the parts may be made in the invention without departing from the spirit and scope thereof.

What is claimed is:

1. A card for storing encoded information, comprising:
   a first opaque, non-magnetic sheet having a fixed form;
   at least one closed-loop code storing medium of conductive material disposed at a given position on said first opaque sheet and having a constricted portion at a portion of the loop thereof, the surfaces of said at least one closed-loop storing medium being divided into at least two portions, each portion bordering the respective constricted portions thereof;
   at least one open-loop code storing medium of conductive material and having substantially the same general shape as said at least one closed-loop code storing medium and cut at the constricted portion thereof, the surfaces of said at least one closed-loop code storing medium being divided into at least two portions, each portion bordering the respective constricted portion thereof; and
   a second opaque, non-magnetic sheet covering said closed-loop and open-loop code storing mediums and being adhered at least to said first sheet with said code storing mediums interposed and sealed between said first and second opaque sheets;
   one of said portions on one side of at least one of said code storing mediums being adhered to said first opaque sheet, and the opposite surface of the other of said portions thereof being adhered to said second opaque sheet, whereby said at least one of said code storing mediums is broken at the respective constricted portions when said first and second opaque sheets are pulled apart.

2. A card according to claim 1, wherein the cut constricted portion of said at least one open-loop code storing medium comprises a heat-melted portion.

3. A card according to claim 1 wherein said first and second portions of said at least one code storing medium are first and second half surface portions thereof, the half surface portions being on opposite sides of said at least one code storing medium and being bordered by the constricted portion.

4. A card according to claim 1 wherein said at least one closed-loop code storing medium is comprised of a conducting material which is meltable at said constricted portion under the influence of an electro-magnetic induction to thereby cut by melting the constricted portion of a respective code storing medium by the Joule heat caused by the current introduced by the electro-magnetic induction.

5. A card according to claim 4, in combination with means for applying electro-magnetic induction thereto, said electro-magnetic induction applying means including an insertion port for receiving a card therein; and means for generating a magnetic flux at at least one predetermined portion in registration with a closed-loop code storing medium for applying electro-magnetic induction to the constricted portion thereof to thereby cut by melting said constricted portion of said closed-loop storing medium to which said electro-magnetic induction is applied.

6. A card according to claim 1 comprising a plurality of said closed-loop code storing mediums.

7. A card according to claim 6 comprising a plurality of said open-loop code storing mediums.

8. A card according to claim 1 comprising a plurality of said open-loop code storing mediums.

9. A card according to claim 1 wherein said at least one of said code storing mediums having its respective portions adhered to said first and second opaque sheets comprises a plurality of closed-loop code storing mediums.

10. A card according to claim 1 wherein said at least one of said code storing mediums having its respective portions adhered to said first and second opaque sheets comprises a plurality of open-loop code storing mediums.

11. A card according to claim 1 wherein all of said open-loop and closed-loop card storing mediums are divided into two surface portions, one of said surface portions of each of said code storing mediums being adhered to said first opaque sheet, and the other of said surface portions thereof being adhered to said second opaque sheet.

12. A method of producing a card for carrying encoded information comprising the steps of:
disposing a plurality of closed-loop code storing mediums of conductive material, each having a constricted portion at a portion thereof, at respective positions on a first opaque, non-magnetic sheet;
adhering a half surface, divided at the border of the constricted portion, of each code storing medium to said first opaque sheet;
adhering an opposite surface of the other half surface of each of said storing mediums to a second opaque, non-magnetic sheet which covers said code storing mediums;
adhering said first and second opaque sheets to each other to seal said code storing mediums between said first and second opaque sheets such that said code storing mediums are broken at the respective constricted portions thereof when said first and second opaque sheets are pulled apart; and
causing an electric current to flow through at least said constricted portion of at least one of said closed-loop code storing mediums to heat and melt said constricted portion under the influence of the Joule heat caused by said electrical current flowing therethrough, thereby changing said at least one closed-loop code storing medium to an open-loop code storing medium.

13. A method for producing a card according to claim 12 wherein the step of causing electric current to flow in said constricted portion comprises applying a magnetic flux to at least the constricted portion of said at least one code storing medium to cause said current to flow by electromagnetic induction.

* * * * *